United States Patent [19]
Ajima

[11] Patent Number: 5,042,908
[45] Date of Patent: Aug. 27, 1991

[54] PROJECTION SCREEN DEVICE

[75] Inventor: Kohsuke Ajima, Tokyo, Japan

[73] Assignee: Pioneer Electronic Corporation, Tokyo, Japan

[21] Appl. No.: 602,542

[22] Filed: Oct. 24, 1990

[30] Foreign Application Priority Data

Jan. 23, 1990 [JP] Japan .................. 2-11940

[51] Int. Cl.⁵ .................. G03B 21/60; H04N 9/31
[52] U.S. Cl. .................. 359/456; 358/60
[58] Field of Search .................. 350/127, 128; 358/60

[56] References Cited

U.S. PATENT DOCUMENTS

| | | | |
|---|---|---|---|
| 4,509,823 | 4/1985 | Moriguchi et al. | 350/128 |
| 4,536,056 | 8/1985 | Oguino | 358/60 X |
| 4,548,469 | 10/1985 | Inoue et al. | 350/128 |
| 4,636,035 | 1/1987 | Clausen et al. | 350/128 |
| 4,647,519 | 3/1987 | Speigel | 350/128 X |
| 4,681,405 | 7/1987 | Balogh et al. | 350/128 X |
| 4,730,897 | 3/1988 | McKechnie et al. | 350/128 |
| 4,859,027 | 8/1989 | Kishida | 350/128 |
| 4,910,010 | 12/1984 | Honda et al. | 358/60 X |
| 4,923,280 | 5/1990 | Clausen et al. | 350/128 |
| 4,927,233 | 5/1990 | Nakanishi et al. | 350/128 |

Primary Examiner—Richard A. Wintercorn
Attorney, Agent, or Firm—Finnegan, Henderson, Farabow, Garrett and Dunner

[57] ABSTRACT

A projection screen device for a back projection type television system for projecting an image by emitting beams from a projector, comprising, a lenticular sheet having black strips provided on an emergent surface of the lenticular sheet, a sensor, which is positioned on the black stripes, for outputting a signal when receiving the beams from the projector, a circuit for automatically adjusting a convergence of the beams from the projector and electrical connecting lines for electrically connecting the sensor and edges of the lenticular sheet so as to input the signal to the circuit.

5 Claims, 4 Drawing Sheets

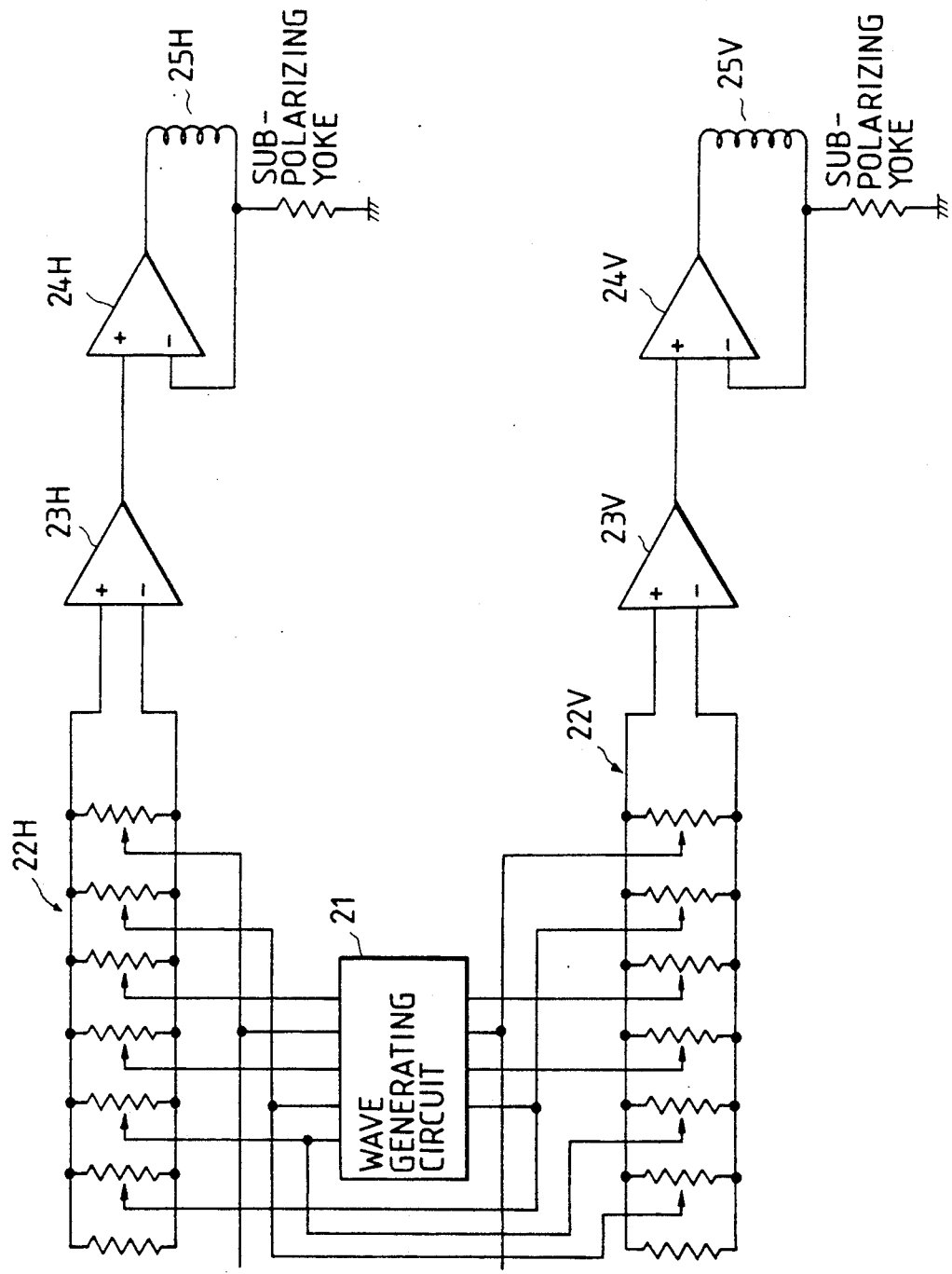

PROJECTION SCREEN DEVICE

BACKGROUND OF THE INVENTION

This invention relates to a screen of a projection television system for projecting an image from projecting tubes thereon, and more particularly to a projection screen of a projection television system in which projecting tubes of red (R), green (G) and blue (B) are aligned in horizontal direction with a convergence adjustment circuit for correcting a chromatic or color deviation generated in a horizontal direction due to the difference in projection angle among the projecting tubes.

In a conventional convergence adjustment circuit for a projection television system, a correction is effected for sub-polarizing yokes for the horizontal direction (H) and the vertical direction (V) by causing a current, corresponding to the chromatic deviation, to flow through the yokes.

Conventionally, an adjuster confirms a distortion pattern of a raster while watching the projection screen, thereby adjusting the current supplied to the sub-polarizing yokes by controlling a volume switch, to correct the chromatic deviation. According to this manual convergence adjustment, there would be a non-uniformity in the adjustment due to the difference in personal adjusting ability and visual ability.

For obviating the non-uniformity, it is desirable to effect an automatic convergence adjustment. As shown in FIG. 7 in a conventional automatic convergence adjustment, a photo receptor 32 with a photo-sensitive elements it moved in a horizontal direction above a surface of a screen 31, so that the convergence adjustment circuit is driven by a signal from the photo-sensitive elements.

In the conventional automatic convergence adjustment, the adjustment must be performed after automatically or manually moving the photo receptor 32 at a preferable position on the screen, and the photo receptor 32 must be moved at the edge of the screen after performing the adjustment. Accordingly, the conventional automatic convergence adjustment suffers problems, e.g. troublesome operations, complicated structures and increased costs.

SUMMARY OF THE INVENTION

An object of the present invention is to provide a projection screen having a simple and low-cost structure which is capable of performing an exact automatic convergence adjustment without any adverse influences to the image thereon, and is capable of easily performing the adjustment.

To achieve the above-mentioned and other objects, there is provided a projection screen device for a back projection type television system for projecting an image by emitting beams form projectors, comprising:

a lenticular sheet having black stripes continuously provided on an emergent surface of said lenticular sheet;

sensor means, positioned on said black stripes, for outputting signals when receiving said beams from said projector;

means for automatically adjusting a convergence of said beams from said projector; and electrical connecting means for electrically connecting said sensor means and edges of said lenticular sheet so as to input said signal to said adjusting means for the convergence.

BRIEF DESCRIPTION OF THE DRAWINGS

In the accompanying drawings:

FIG. 6 is a convergence circuit diagram according to the present invention; and

DETAILED DESCRIPTION OF THE PREFERRED EMBODIMENT

A preferred embodiment of the present invention will be described with reference to FIGS. 1-6.

Figure 2:
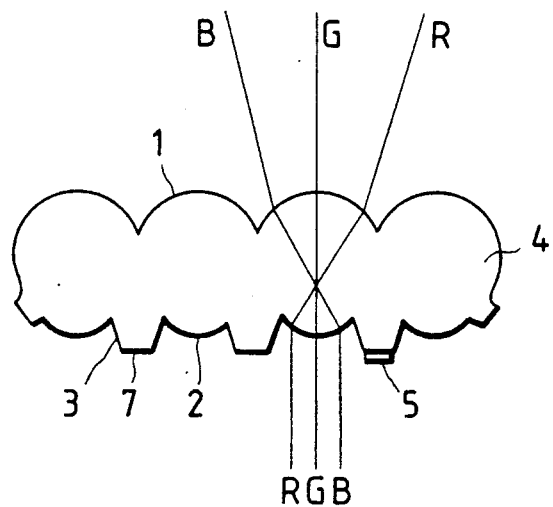
FIG. 2 is a section view of a screen shown in FIG. 1.
Figure 7:
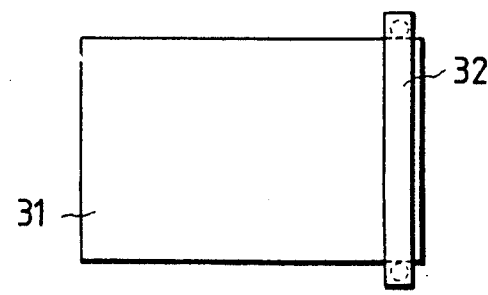
FIG. 7 is a front elevation view of a conventional projection screen.

FIG. 2 shows a section of a so-called black stripe matrix type screen. The projection screen is formed of a lenticular sheet 4 which is composed of cylindrical lenses 1 extending in a vertical scanning direction on an incident surface of the screen, cylindrical lenses 2 extending on an emergent surface of the screen concentrically with the cylindrical lenses 1 and projection ridges 3 positioned between cylindrical lenses 2 each having a trapezoidal shape in cross section.

In the lenticular sheet 4, as shown in FIG. 2, a large part of each of the beams of R, G and B will not reach the projection ridges 3, since the beams are refracted by the lenses 1 when the beams are incident to the screen and are refracted by the lens 2 when the beams are emergent from the screen.

Figure 1:
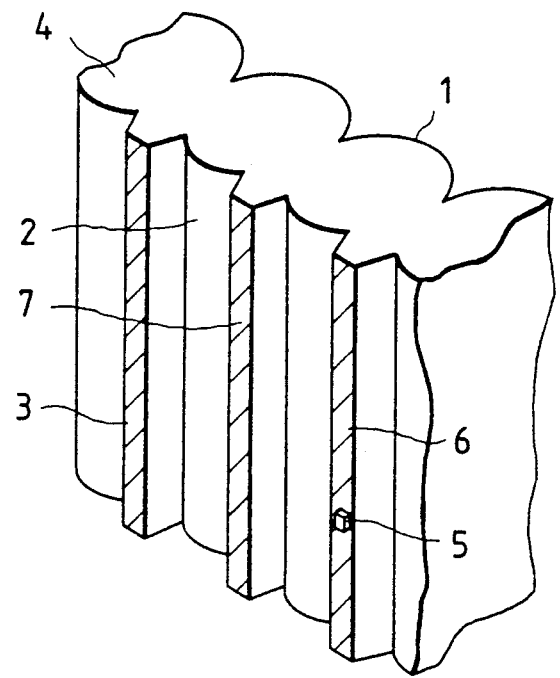
FIG. 1 is an enlarged perspective view of a part of one example of a screen according the present invention.
Figure 3:
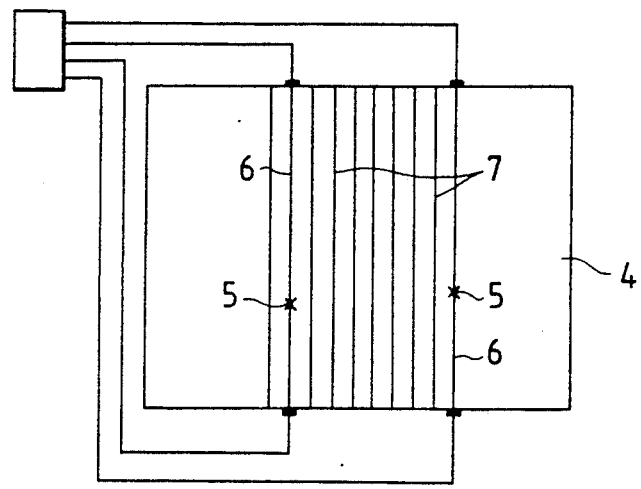
FIG. 3 is a front elevation view of a screen shown in FIG. 1.

As shown in FIGS. 1 and 3, photo sensors 5 are provided on plural projection ridges 3 spacing a predetermined distance, respectively, and the top surfaces of the projection ridges 3 leading to the photo sensors 5 are coated with electrical conductive black paints 6 for forming a circuit for each photo sensor 5.

Moreover, the projection ridges 3 on which the photo sensors 5 are not provided are coated with black paints 7. Therefore the black paints 6 and 7 form black stripes of the lenticular sheet 4.

Figure 4:
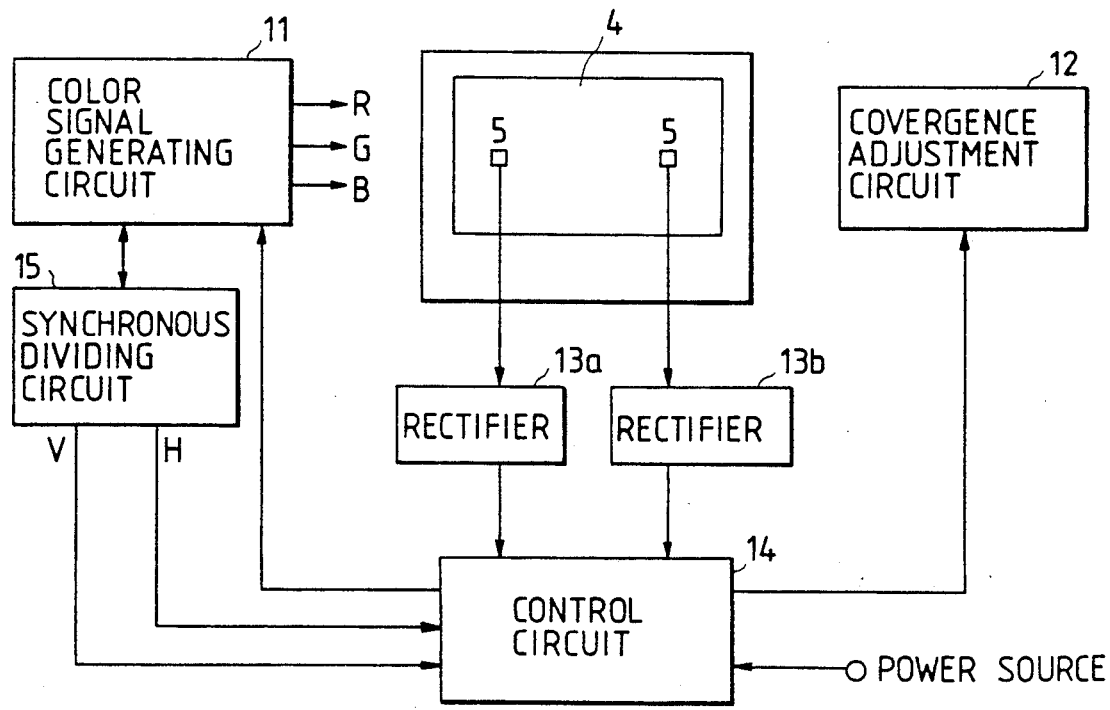
FIG. 4 is a block diagram of an automatic convergence adjustment according to the present invention.

FIG. 4 shows a block diagram of an automatic convergence adjustment of a projection television system according to the present invention. A color signal generating circuit 11 drives three projecting tubes (not shown) of R, G and B. A convergence adjustment circuit 12 is used to correct a chromatic or a color deviation.

When the beams enter into the lenticular sheet 4 by a vertical or a horizontal scan, portions of the incident beams enter the sensors 5, output signals from the sensors 5 are rectified as pulse signals by rectifiers 13a and 13b and the signals are inputted into a control circuit 14.

Figure 5:
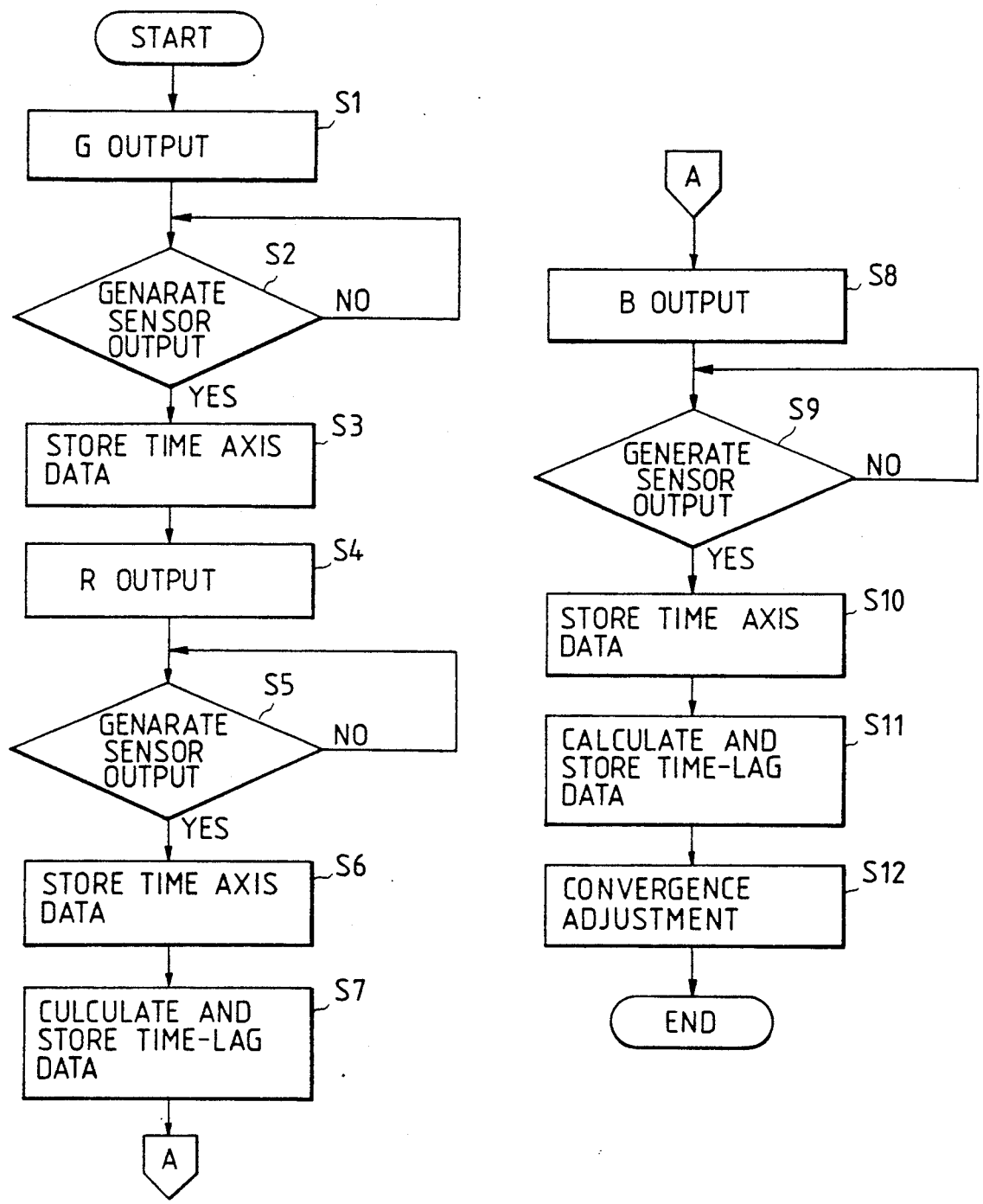
FIG. 5 is a flow chart of the block diagram shown in FIG. 4.

The control circuit 14 is constituted by, for example, a micro computer and driven according to a flow chart shown in FIG. 5 by the processor thereof during the convergence adjusting.

The processor drives the projecting tube (G) for projecting green beam toward the lenticular sheet 4 (step S1) by switching an output from the color signal generating circuit 11 in response to the ON operation of a power source. Furthermore, the processor watches an output of the sensor 5 (step S2).

Moreover, the processor stores timings for the signal outputs of the sensors 5 from scanning starts of a first field, as time axis data in a vertical and a horizontal direction on the basis of a vertical synchronous signal V and a horizontal synchronous signal H of a synchronous dividing circuit 15 (step S3).

Next, the processor drives a projecting tube (R) for projecting a red beam toward the lenticular sheet 4 (step S4), and stores the time axis data of the red beam for the timings of the signal outputs of the sensors 5 in a vertical and a horizontal direction (steps S5 and S6), according to the same steps as those of the (G) beam. Moreover, the processor calculates a time-lag data from the time axis data of the green beam to the time axis data of the red beam at the sensor 5 on the lenticular sheet 4 shown in FIG. 4, and stores this time-lag data representative of a chromatic deviation of the red beam against the green beam (step S7).

Furthermore, the processor stores a chromatic deviation of a blue beam relative to the green beam as time lag data (steps S8–S11), according to the same steps as those of the (R) beam.

Since the processor stores the chromatic deviations of the blue and the red beam relative to the green beam as the time lag data at the position of the sensors 5, the chromatic deviations are corrected by driving the convergence adjustment circuit 12 based on the stored time lag data (step S12).

As shown in FIG. 6, for example, the convergence adjustment circuit 12 comprises a waveform generating circuit 21 which generates analog waveforms of various kind such as V/H sawtooth waves and V/H parabolic waves, for correcting the respective deviation patterns of a raster, VR circuits 22H and 22V constituted by variable resistors (VR) connected in parallel for controlling each of output levels of the analog waveforms, matrix-amplifiers 23H and 23V for mixing analog waveforms after controlling the output levels, and driving amplifiers 24H and 24V for driving sub-polarizing yokes 25H and 25V, respectively, based on the outputs of the matrix-amplifiers 23H and 23V. The convergence adjustment circuit 12 is used for correcting the chromatic deviation to change the supplied currents to the sub-polarizing yokes 25H and 25V by the control circuit 14 adjusting the resistance values of the VR circuits 22H and 22V.

Additionally, the convergence adjustment circuit 12 is not restricted to the structure shown in FIG. 6. It is possible to apply a digital convergence adjustment system or any other various kinds of systems to the circuit 12. For example, the digital system may be used to change a waveform per se by generating correction waveform data themselves from a micro computer so as to perform a convergence adjustment.

Furthermore, the convergence adjustment is performed in the ON operation of the power source in the above embodiment, but such an adjustment start timing is not limited to the specific embodiment. The adjustment start timing may be decided automatically or manually by the user.

Moreover, mount positions and the number of the photo sensors may be changed as desired. The more the number of the sensors, the more the convergence adjustment will become.

In accordance with the present invention, at least one photo sensor is provided on the projection ridge having the black-stripe which the beams from the lenticular sheet formed by the lenticular lens could not be reached. The convergence adjustment is automatically performed by the beam reception on the sensor. Therefore, it is possible to provide a simple and low-cost projection screen which may perform an exact automatic convergence adjustment without any adverse influences to the image thereon, and may easily carry out the adjustment.

Since those black stripes are used to prevent an outer-light reflection and a diffused reflection in the lenticular sheet and obtain high contrast, an image is not projected on the black-stripe. Accordingly, if each sensor is provided on the projection ridge, the image on the screen is not adversely affected by the sensor.

Furthermore, since the convergence adjustment according to the present invention may be automatically performed at anytime after setting the screen or the projecting tube on the cabinet, it is possible to provide a projecting image without any chromatic deviation, so that to ensure high quality image.

What is claimed is:

1. A projection screen device for a back projection type television system for projecting an image by emitting beams form projectors, comprising:
   a lenticular sheet having black stripes continuously provided on an emergent surface of said lenticular sheet;
   sensor means, positioned on said black stripes, for outputting signals when receiving said beams from said projector;
   means for automatically adjusting a convergence of said beams from said projector; and
   electrical connecting means for electrically connecting said sensor means and edges of said lenticular sheet so as to input said signal to said adjusting means for the convergence.

2. A projection screen device as claimed in claim 1, wherein said lenticular sheet comprises cylindrical lenses on said emergent surface.

3. A projection screen device as claimed in claim 2, wherein projecting ridges are formed on said emergent surface of said lenticular sheet, said black stripes being provided on said ridges.

4. A projection screen device as claimed in claim 3, wherein said lenticular sheet comprises cylindrical lenses on an incident surface of said lenticular sheet for refracting said beams from said projector to said emergent surface except for said projecting ridges.

5. A projection screen device as claimed in claim 1, wherein said electrical connecting means are electrical conductive black paints.

* * * * *

UNITED STATES PATENT AND TRADEMARK OFFICE
CERTIFICATE OF CORRECTION

PATENT NO. : 5,042,908

DATED : August 27, 1991

INVENTOR(S) : Kohsuke AJIMA

It is certified that error appears in the above-identified patent and that said Letters Patent is hereby corrected as shown below:

Abstract, line 4, change "strips" to --stripes--.

Abstract, line 6, change "outputing" to --outputting--.

Claim 1, column 4, line 33, change "form" to --from--.

Signed and Sealed this

Thirteenth Day of April, 1993

Attest:

STEPHEN G. KUNIN

*Attesting Officer*       *Acting Commissioner of Patents and Trademarks*